United States Patent
Legakis et al.

(12) 
(10) Patent No.: US 9,922,457 B2
(45) Date of Patent: *Mar. 20, 2018

(54) COMPUTING TESSELLATION COORDINATES USING DEDICATED HARDWARE

(71) Applicant: NVIDIA CORPORATION, Santa Clara, CA (US)

(72) Inventors: Justin S. Legakis, Sunnyvale, CA (US); Emmett M. Kilgariff, San Jose, CA (US); Michael C. Shebanow, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/094,567

(22) Filed: Dec. 2, 2013

(65) Prior Publication Data

US 2014/0160126 A1 Jun. 12, 2014

Related U.S. Application Data

(63) Continuation of application No. 12/240,390, filed on Sep. 29, 2008, now Pat. No. 8,599,202.

(51) Int. Cl.
*G06T 15/30* (2011.01)
*G06T 17/20* (2006.01)
*G06T 15/00* (2011.01)

(52) U.S. Cl.
CPC ........... *G06T 17/20* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 5,953,015 A * | 9/1999 | Choi | .................... | G06T 15/04 345/428 |
| 6,002,410 A * | 12/1999 | Battle | .................... | G06T 15/005 345/552 |
| 6,184,894 B1 * | 2/2001 | Rosman | .................... | G06T 3/4007 345/428 |
| 6,304,268 B1 * | 10/2001 | Iourcha | .................... | G06T 3/4007 345/428 |
| 6,504,537 B1 * | 1/2003 | Moreton | .................... | G06T 17/20 345/423 |
| 6,717,577 B1 * | 4/2004 | Cheng et al. | .................... | 345/419 |
| 6,747,649 B1 * | 6/2004 | Sanz-Pastor | .................... | G06T 15/00 345/428 |
| 6,940,505 B1 * | 9/2005 | Savine et al. | .................... | 345/423 |
| 7,050,063 B1 * | 5/2006 | Mantor | .................... | G06T 1/60 345/535 |

(Continued)

*Primary Examiner* — Anh-Tuan V Nguyen

(74) *Attorney, Agent, or Firm* — Artegis Law Group, LLP

(57) ABSTRACT

A system and method for performing tessellation of three-dimensional surface patches performs some tessellation operations using programmable processing units and other tessellation operations using fixed function units with limited precision. (u,v) parameter coordinates for each vertex are computed using fixed function units to offload programmable processing engines. The (u,v) computation is a symmetric operation and is based on integer coordinates of the vertex, tessellation level of detail values, and a spacing mode.

17 Claims, 10 Drawing Sheets

(56) References Cited

U.S. PATENT DOCUMENTS

| | | | |
|---|---|---|---|
| 7,106,336 B1* | 9/2006 | Hutchins | G06T 11/40 345/427 |
| 7,200,532 B1* | 4/2007 | Cheng | 703/2 |
| 7,256,792 B1* | 8/2007 | Donovan et al. | 345/582 |
| 7,372,468 B1* | 5/2008 | Toksvig | G06T 15/04 345/582 |
| 7,948,489 B1* | 5/2011 | Barnes | G06T 17/20 345/419 |
| 2004/0012563 A1* | 1/2004 | Papakipos et al. | 345/157 |
| 2004/0196285 A1* | 10/2004 | Rice et al. | 345/423 |
| 2004/0257363 A1* | 12/2004 | Veach | G06T 17/205 345/423 |
| 2005/0179686 A1* | 8/2005 | Christensen | G06T 15/06 345/423 |
| 2005/0237335 A1* | 10/2005 | Koguchi | H04N 19/43 345/582 |
| 2005/0253843 A1* | 11/2005 | Losasso Petterson | G06T 15/10 345/428 |
| 2005/0259882 A1* | 11/2005 | Dewaele | G06T 7/66 382/243 |
| 2006/0050072 A1* | 3/2006 | Goel | 345/423 |
| 2006/0125824 A1* | 6/2006 | Sfarti | G06T 17/205 345/423 |
| 2006/0197760 A1* | 9/2006 | Yamada | 345/423 |
| 2007/0008333 A1* | 1/2007 | Xu | G06T 15/04 345/582 |
| 2007/0247458 A1* | 10/2007 | Surazhsky | G06T 17/20 345/423 |
| 2008/0043023 A1* | 2/2008 | Loop et al. | 345/441 |
| 2008/0159651 A1* | 7/2008 | Stoll | G06T 15/06 382/284 |
| 2009/0021513 A1* | 1/2009 | Joshi | G06T 15/503 345/419 |
| 2009/0237400 A1* | 9/2009 | Patel et al. | 345/423 |

\* cited by examiner

COMPUTING TESSELLATION COORDINATES USING DEDICATED HARDWARE

CROSS-REFERENCE TO RELATED APPLICATIONS

This application is a continuation application of co-pending United States application titled, "COMPUTING TESSELLATION COORDINATES USING DEDICATED HARDWARE," filed on Sep. 29, 2008 and having Ser. No. 12/240,390, which is hereby incorporated herein by reference.

BACKGROUND OF THE INVENTION

Field of the Invention

The present invention generally relates to tessellation of three-dimensional surface patches and more specifically to computing tessellation coordinates of output vertices using dedicated hardware.

Description of the Related Art

The programming model for tessellation hardware has evolved to expose new shader programs that are executed to perform tessellation of three-dimensional surface patches. Some of the tessellation operations may be performed in parallel and do not require floating point precision arithmetic.

Accordingly, what is needed in the art is an improved system and method for performing tessellation operations using a combination of programmable circuitry and fixed function circuitry.

SUMMARY OF THE INVENTION

A system and method for performing tessellation of three-dimensional surface patches performs some tessellation operations using programmable processing units and other tessellation operations using fixed function units with limited precision. (u,v) parameter coordinates for each vertex are computed using fixed function units to offload programmable processing engines and improve overall system processing performance. The (u,v) computation is a symmetric operation that is based on integer coordinates of the vertex, tessellation level of detail values, and a spacing mode.

Various embodiments of a method of the invention for performing tessellation operations using a graphics processor include receiving a set of control points defining a three-dimensional surface patch at the graphics processor and determining tessellation level of detail values for the three-dimensional surface patch. A fixed function computation unit within the graphics processor computes (u, v) coordinates for each vertex of the surface patch based on the tessellation level of detail values using a symmetric computation.

Various embodiments of the invention include a system for performing tessellation operations using a graphics processor. The graphics processor is configured to receive a set of control points defining a three-dimensional surface patch for tessellation and determine tessellation level of detail values for the three-dimensional surface patch. The graphics processor includes a fixed function computation unit that is configured to compute (u, v) coordinates for each vertex of the surface patch based on the tessellation level of detail values using a symmetric computation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
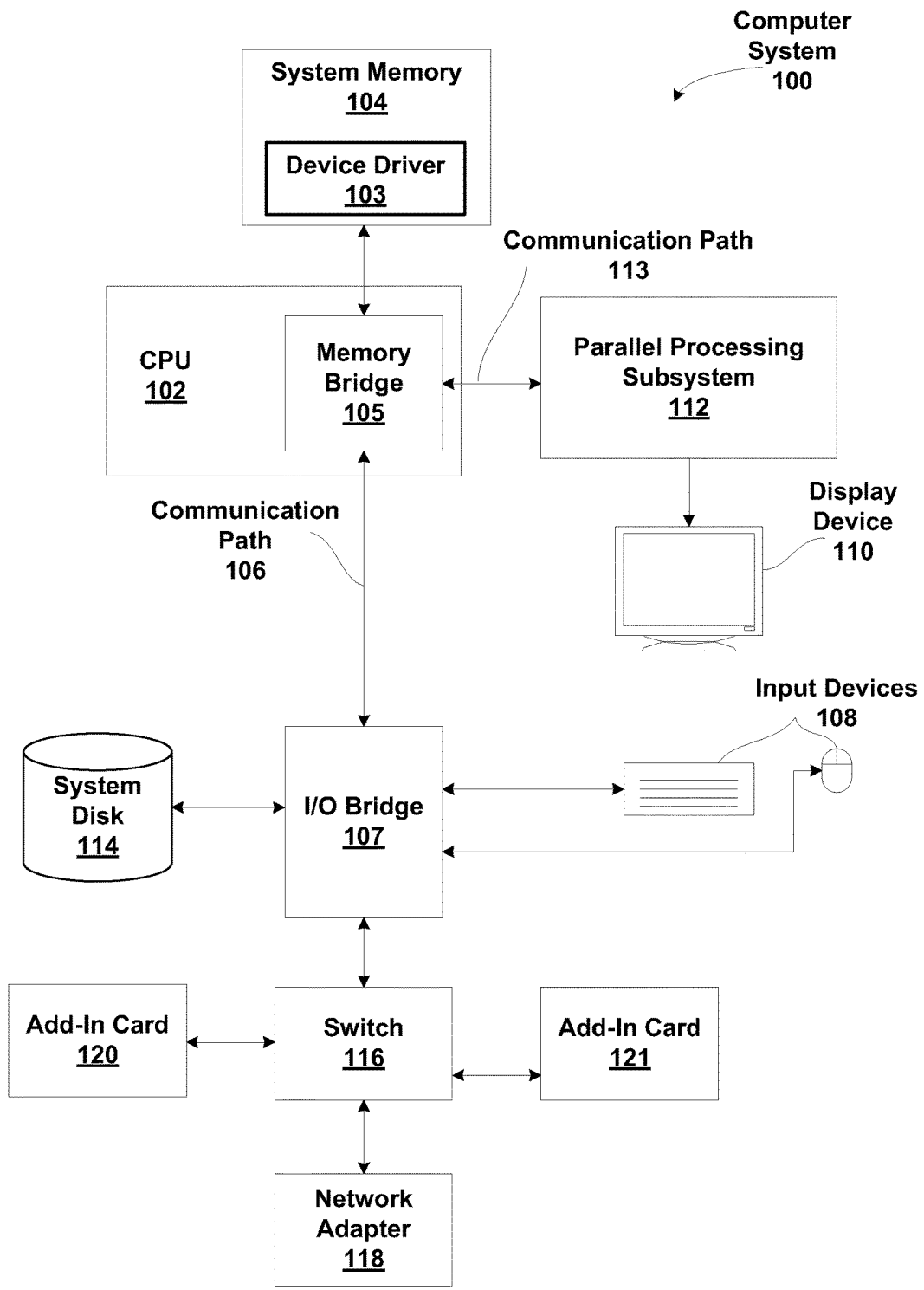
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 are integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
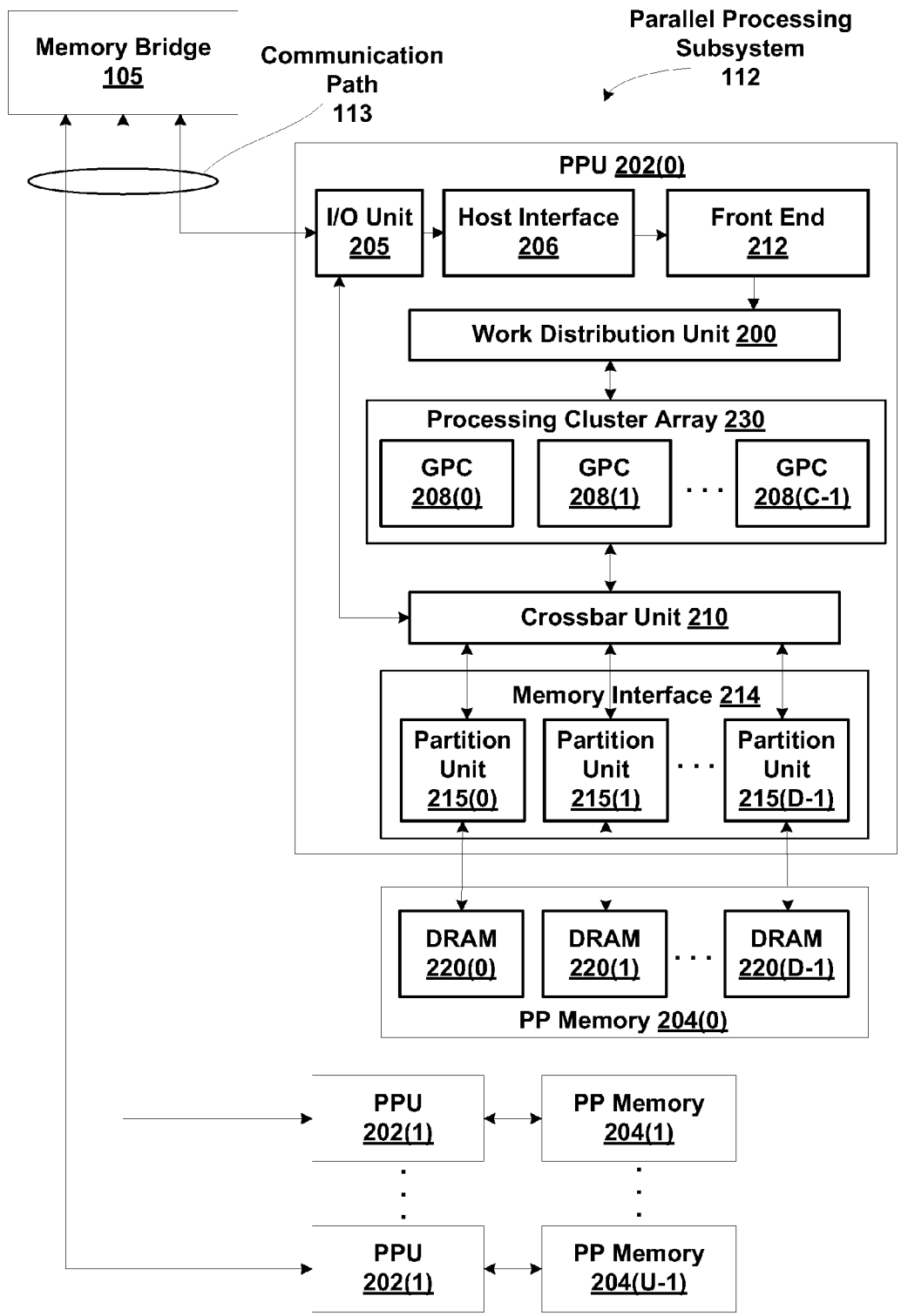
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers, which PPUs 202 may read in response to commands in the command buffer. Each command and data buffer may be read by multiple PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0)

includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation. Alternatively, all GPCs 208 may be allocated to perform processing tasks using time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the tasks, work distribution unit 200 may receive the pointers from front end 212, or work distribution unit 200 may receive the data directly. In some embodiments of the present invention, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing efficiently accommodates any expansion and contraction of data produced by the different types of processing. Intermediate data produced by GPCs 208 may buffered to allow the intermediate data to be transmitted between GPCs 208 with minimal stalling when a rate at which data is accepted by a downstream GPC 208 lags the rate at which data is produced by an upstream GPC 208.

Memory interface 214 may be partitioned into a number D of memory partition units that are each directly coupled to a portion of parallel processing memory 204, where D≥1. Each portion of memory generally consists of one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
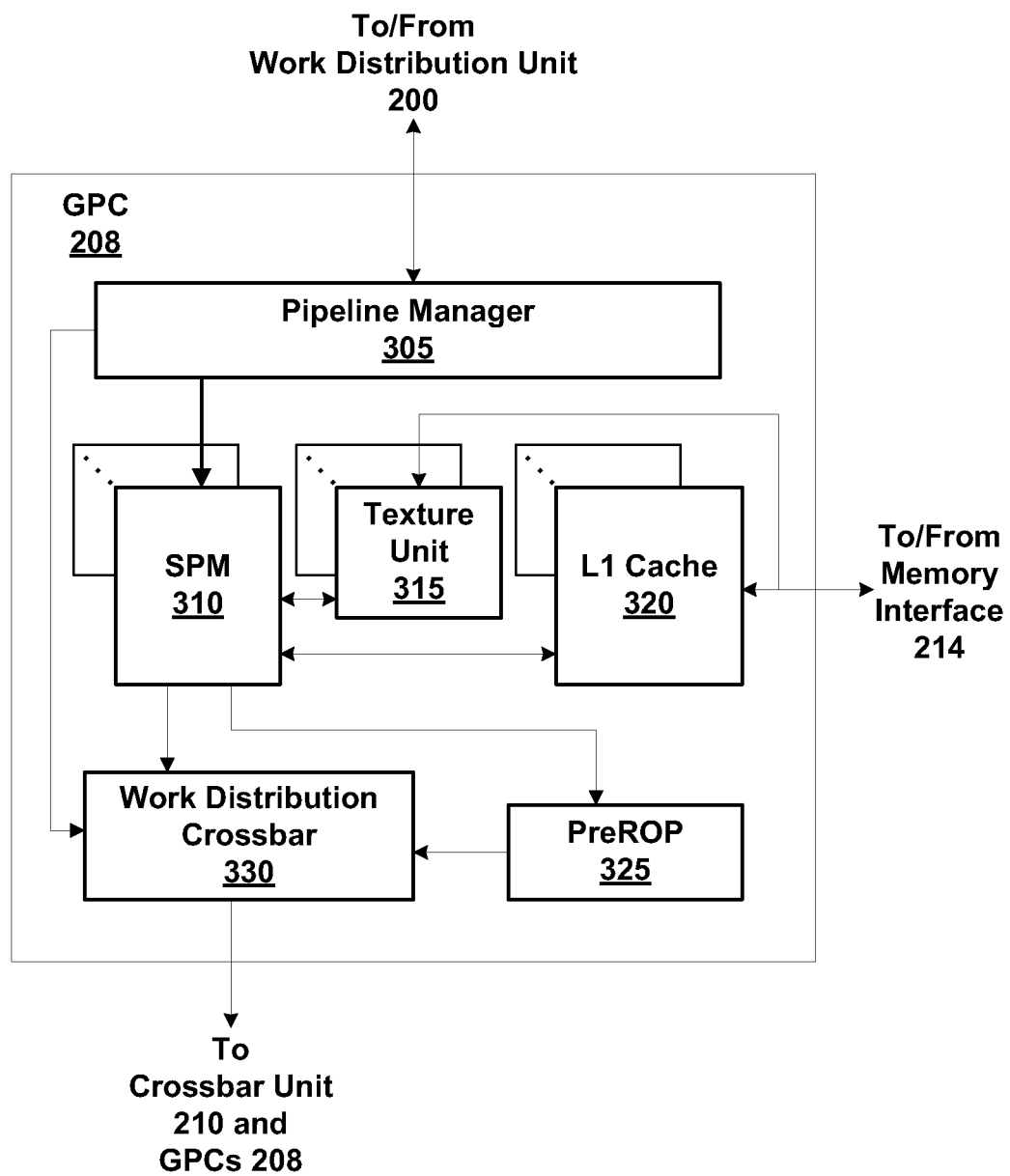
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread and a shared per-CTA address space is used to pass data between threads within a CTA. Data stored in the per-thread local address space and per-CTA address space is stored in L1 cache 320 and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320 and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
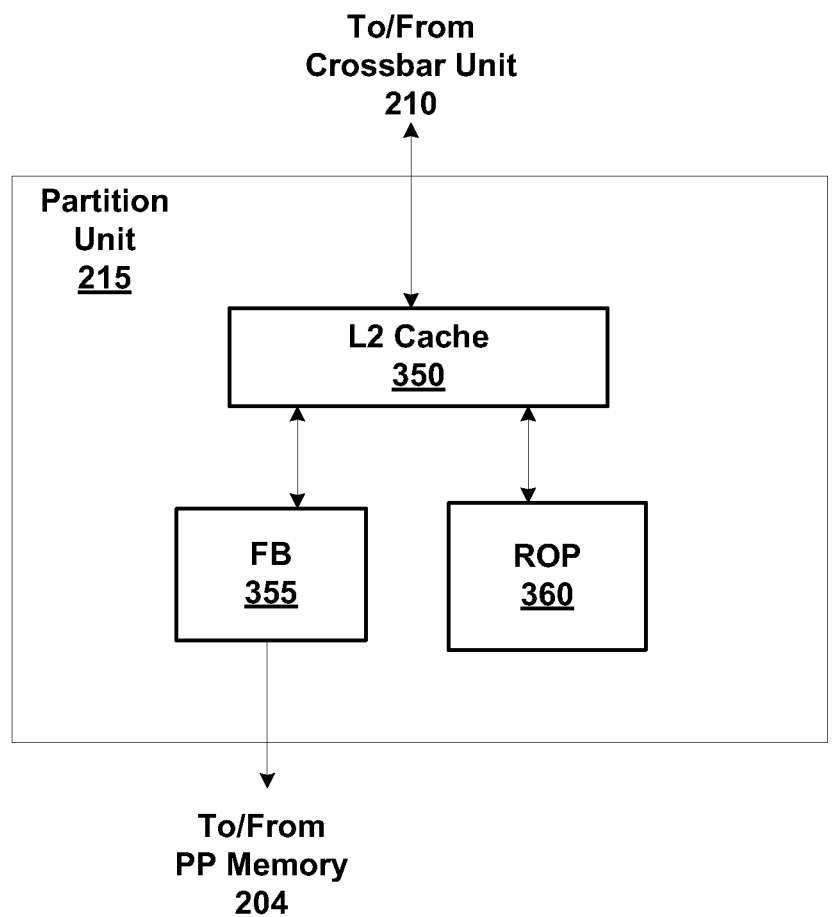
FIG. 3B is a block diagram of a partition unit within one of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/ write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of each partition unit 215, and pixel reads and writes are transmitted over crossbar unit 210 instead of pixel fragment.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
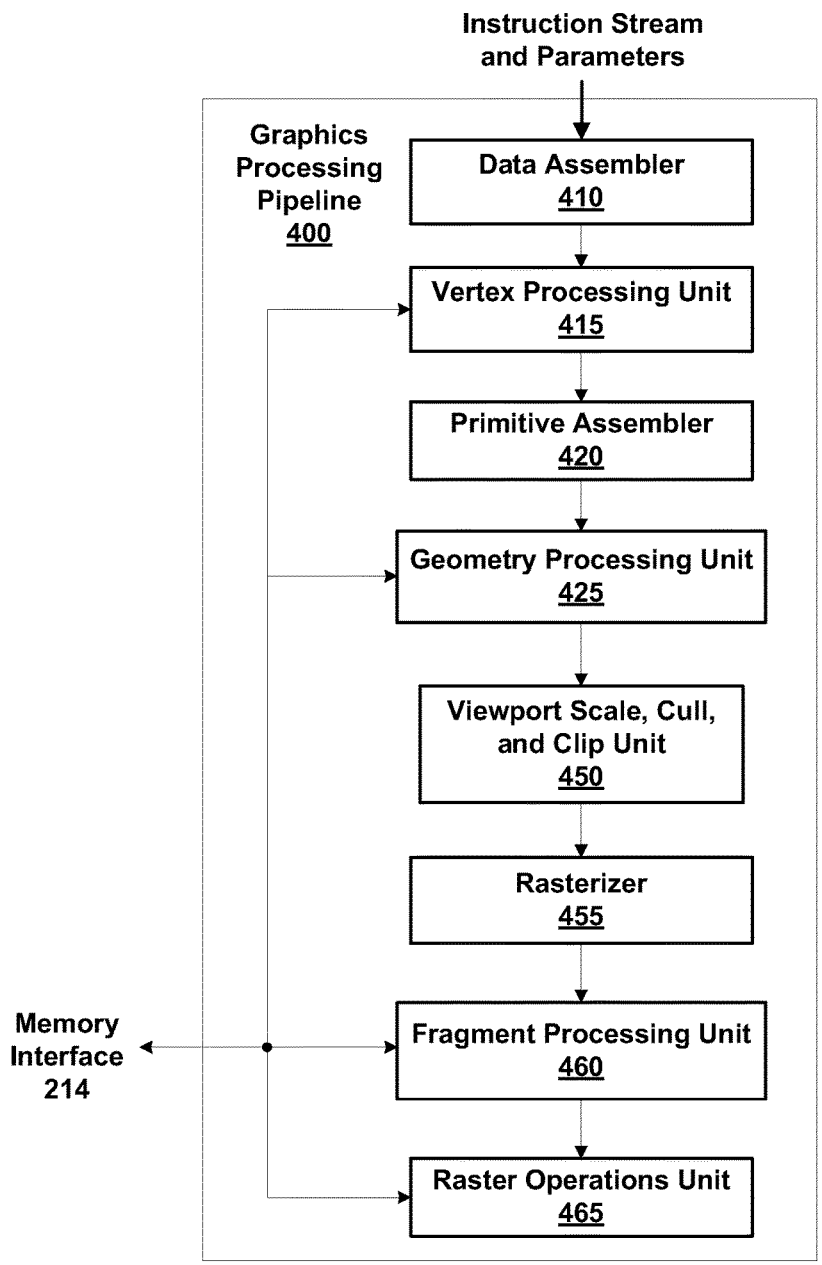
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Tessellation Operations

Surfaces constructed of three-dimensional patches, such as Bezier patches, NURBS (non-uniform rational b-splines), and subdivision surfaces are tessellated to form graphics primitives. A task generator receives a stream of patch data and tessellation information (tessellation level of detail values) and outputs portions of the patch data for processing. Each portion is called a task and each task may be independently processed. Each task is one of an entire patch, part of an interior region of the patch, or part of a boundary transition region of the patch. The tasks are distributed to GPCs 208 in order to process the tasks in parallel. The number of vertices produced by tessellating each patch is variable, depending on the tessellation level of detail (LOD), so a patch is divided into one or more tasks each having approximately equal processing requirements. The number of vertices in each patch can be determined using the tessellation LODs for each patch, before the vertex attributes are computed. Therefore, it is possible to generate the tasks and distribute the computation of vertex attributes.

Figure 5A:
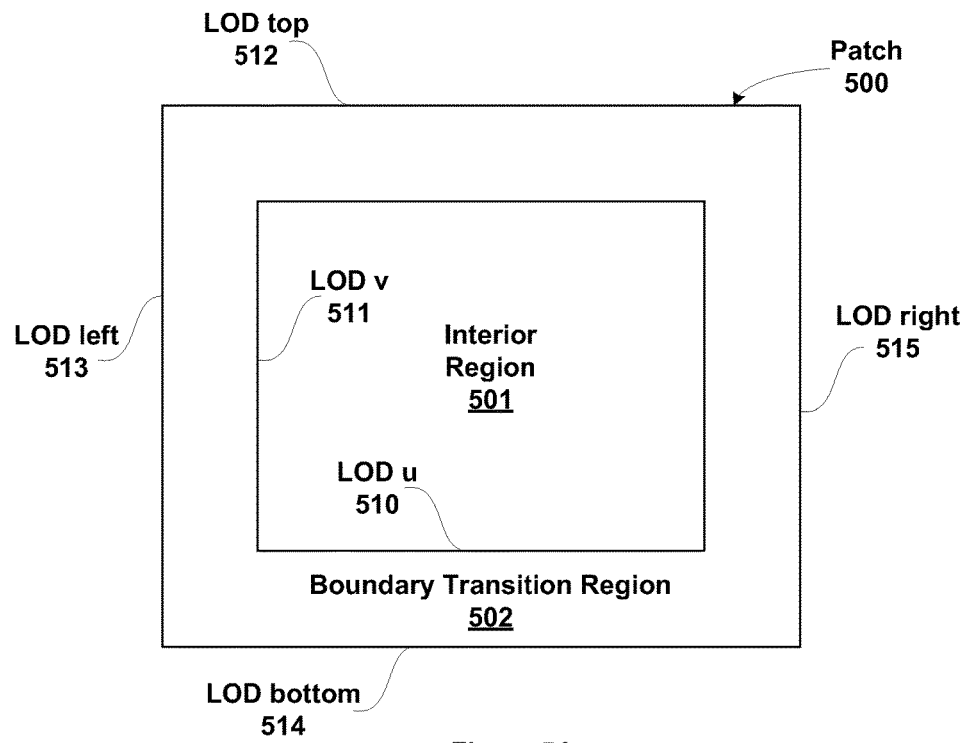
FIG. 5A illustrates regions of a surface patch, according to one embodiment of the present invention.

FIG. 5A illustrates an interior region 501 and a transition region 502 of a patch 500, in accordance with one or more aspects of the present invention. Interior region 501 has a tessellation LOD along each edge and the interior region LODs (two, one in each direction) are also LODs of transition region 502, in addition to the four LODs along each edge of patch 500. Transition region 502 can be broken into separate regions that are each associated with an edge of patch 500 and include a one primitive wide band around the perimeter of interior region 501. Vertices on the edges of transition region 502 are stitched to define a topology of transition region 502. The topology includes primitives that form a smoothly-varying triangle mesh for various combinations of tessellation LODs. The triangle mesh topology varies smoothly as the tessellation LODs change over time and across adjacent transition regions 502.

Figure 5B:
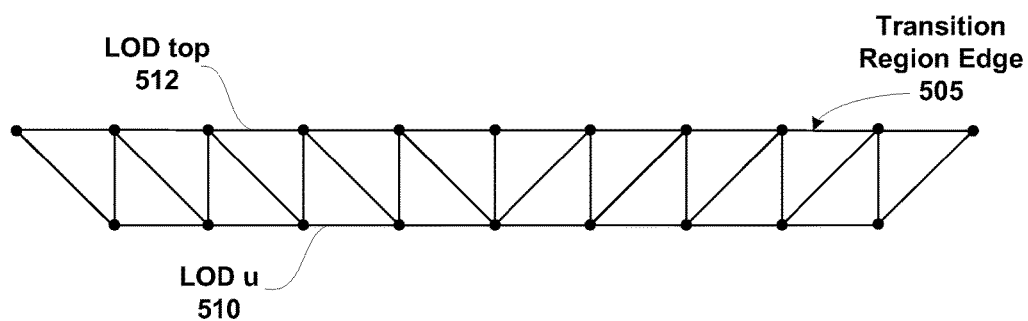
FIG. 5B illustrates a transition region edge, according to one embodiment of the present invention.

FIG. 5B illustrates a section of boundary transition region 502, a transition region edge 505, in accordance with one or more aspects of the present invention. The tessellation LOD associated with each edge of transition region edge 505 determines the number of segments along each edge. The number of segments corresponding to LOD top 512 is ten, as shown in FIG. 5B. The number of segments corresponding to LOD u 510 is equal to LODu 510−2 (eight when LODu 510 is ten, as shown in FIG. 5B). Similarly, interior region 501 is tessellated according to the tessellation LODs associated with interior region 501. The tessellation LOD values on either side of transition region edge 505 may differ. Stitching should produce a set of non-intersecting graphics primitives (triangles) that completely cover transition region edge 505 and that include vertices that are common with a boundary transition region of any adjacent patch. Vertices for a set of graphics primitives are grouped into tasks, where each task is a workload unit. The tasks are distributed to GPCs 208 by work distribution unit 200. A task for a boundary transition region includes the vertices that are common with the boundary transition region of any adjacent patch. Including the common vertices for patch and task boundaries within each task allows each task to be processed independently.

The number of vertices (num_verts) that are produced for a patch is computed based on the LOD values. The number of vertices produced for quadrilateral graphics primitives is:

$$\text{num\_verts}=(\text{lod}\_u-1)*(\text{lod}\_v-1)+\text{lod\_left}+\text{lod\_right}+\text{lod\_bottom}+\text{lod\_top}.$$

In addition to quadrilateral patches, such as patch 500, triangular patches may also be used. The number of vertices computed for a triangular patch is:

$$\text{num\_verts}=\text{ceil}((\tfrac{3}{4})*(\text{lod}\_u-1)*(\text{lod}\_u-1))+\text{lod\_left}+\text{lod\_right}+\text{lod\_bottom}.$$

The number of vertices of a quadrilateral isoline patch is:

$$\text{num\_verts}=(\text{lod\_bottom}\_i+1)*\text{lod\_left}\_i.$$

Note that only two LODs are used for the isoline domain since there are no boundary transition regions.

Figure 6A:
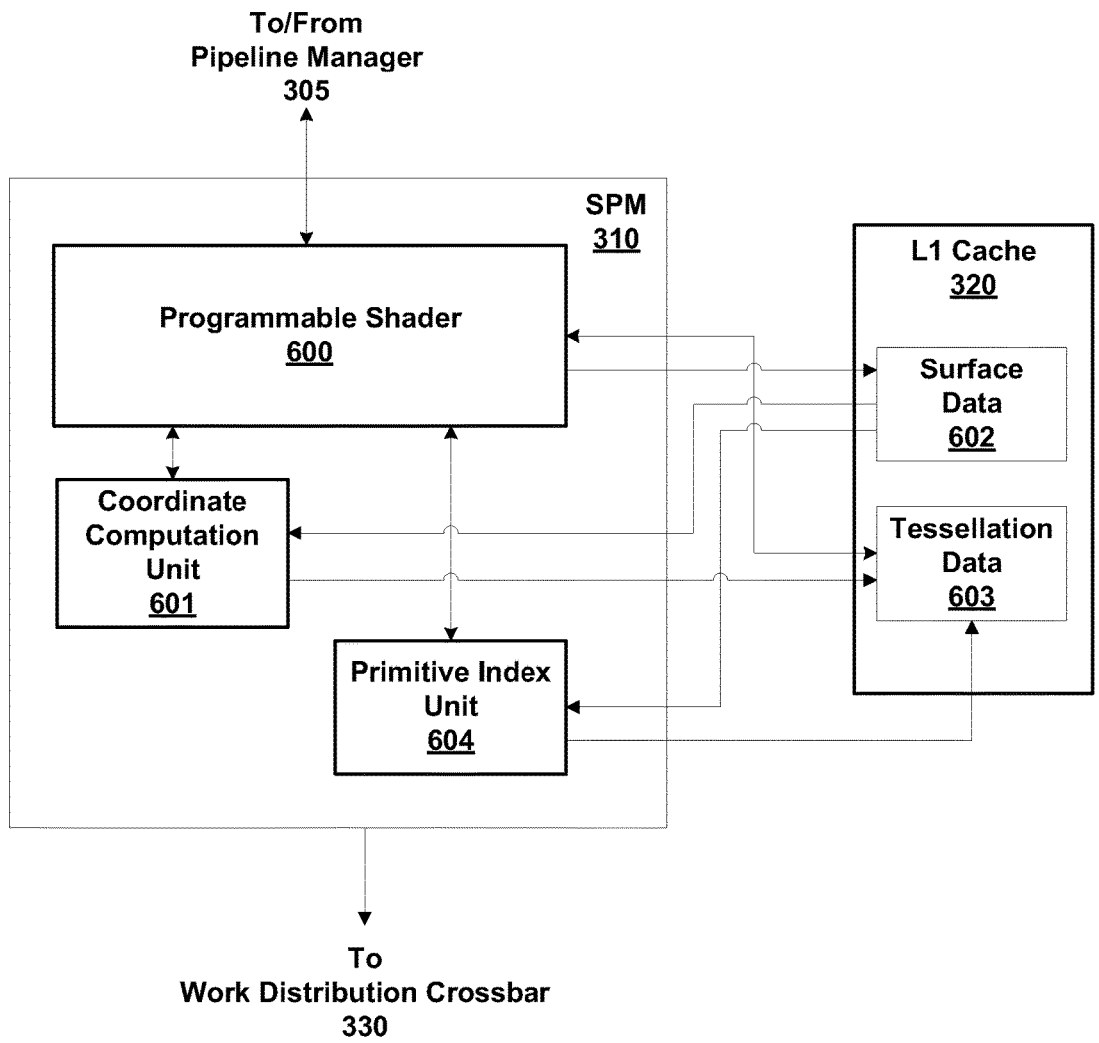
FIG. 6A is a block diagram of an SPM configured to perform tessellation operations, according to one embodiment of the present invention.

FIG. 6A is a block diagram of an SPM 310 configured to perform tessellation operations, according to one embodiment of the present invention. A programmable shader 600 within SPM 310 may be configured to execute vertex shader programs to process surface patches and produce tasks, including control points of graphics primitives and LOD values. Device driver 103 may configure programmable shader 600 to execute a tessellation control shader program to perform a change of basis of a control point, computation of tessellation LODs parameters, or the like, and is executed once for each surface patch.

The tasks may be stored in L1 cache 320 as surface data 602. A primitive index unit 604 is fixed function circuitry that is configured to compute and output indices based on LOD values that are stored as part of surface data 602. The topology may be represented as a stream of indices that each reference a vertex. The stream of indices may be stored in L1 cache 320 as a portion of tessellation data 603. A coordinate computation unit 601 is fixed function circuitry (dedicated hardware) that is configured to read LOD values stored as part of surface data 602 and compute a (u,v) coordinate for each output vertex, as described in conjunction with FIGS. 6B and 6C. The (u,v) coordinates are stored as part of tessellation data 603.

Once the (u,v) coordinates for the output vertices of a task are stored in tessellation data 603, programmable shader 600 reads the (u,v) coordinates and topology from tessellation data 603 and control points from surface data 602 to produce attributes of the output vertices, such as x, y, and z position coordinates, and store the attributes as part of tessellation data 603. Programmable shader 600 may process the (u,v) coordinates while the stream of indices is being produced by primitive index unit 604. In some embodiments of the present invention, programmable shader 600 is configured to execute a tessellation evaluation shader program to compute a final position and attributes of each vertex based on the patch primitive control points, parametric (u,v) position for each vertex, displacement maps, and the like, and is executed once for each output vertex.

In some embodiments of the present invention, programmable shader 600 may be capable of computing parametric (u,v) coordinates for each vertex, however providing dedicated hardware (fixed-function circuitry) to perform the computation offloads programmable shader 600 for performing other operations, and improves overall system processing performance. Programmable shader 600 is typically configured to perform high precision computations using floating point arithmetic rather than lower precision fixed point arithmetic. Therefore, the circuitry within programmable shader 600 is most efficiently used to perform high precision computations rather than low precision computations. Offloading the limited precision (u,v) coordinate computation to dedicated circuitry (coordinate computation unit 601) allows programmable shader 600 to be used for that higher precision computations that may be performed in parallel with the lower precision coordinate computation operations and topology stitching operations. The circuitry of coordinate computation unit 601 is configured to perform limited set of low precision arithmetic operations and is therefore more compact than the circuitry of programmable shader 600.

Figure 6B:
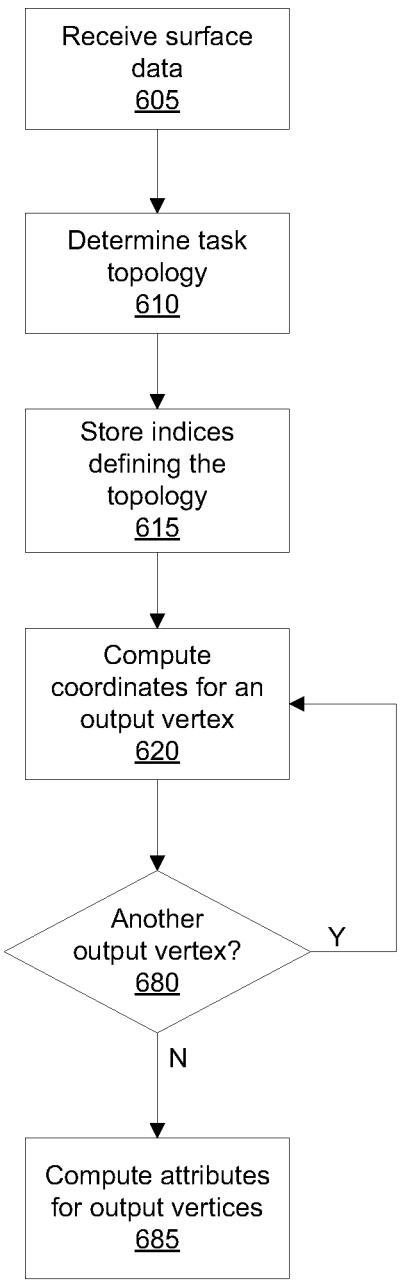
FIG. 6B is a flow diagram of method steps for performing tessellation operations, according to one embodiment of the present invention.

FIG. 6B is a flow diagram of method steps for performing tessellation operations, according to one embodiment of the present invention. In step 605 surface data 602 is stored in L1 cache 320 and may be read by coordinate computation unit 601 and/or primitive index unit 604. In step 610 primitive index unit 604 reads the LOD values stored in surface data 602 to produce a stream of vertex indices that define a topology of graphics primitives. In step 615 primitive index unit 604 stores the stream of vertex indices in tessellation data 603.

Figure 6C:
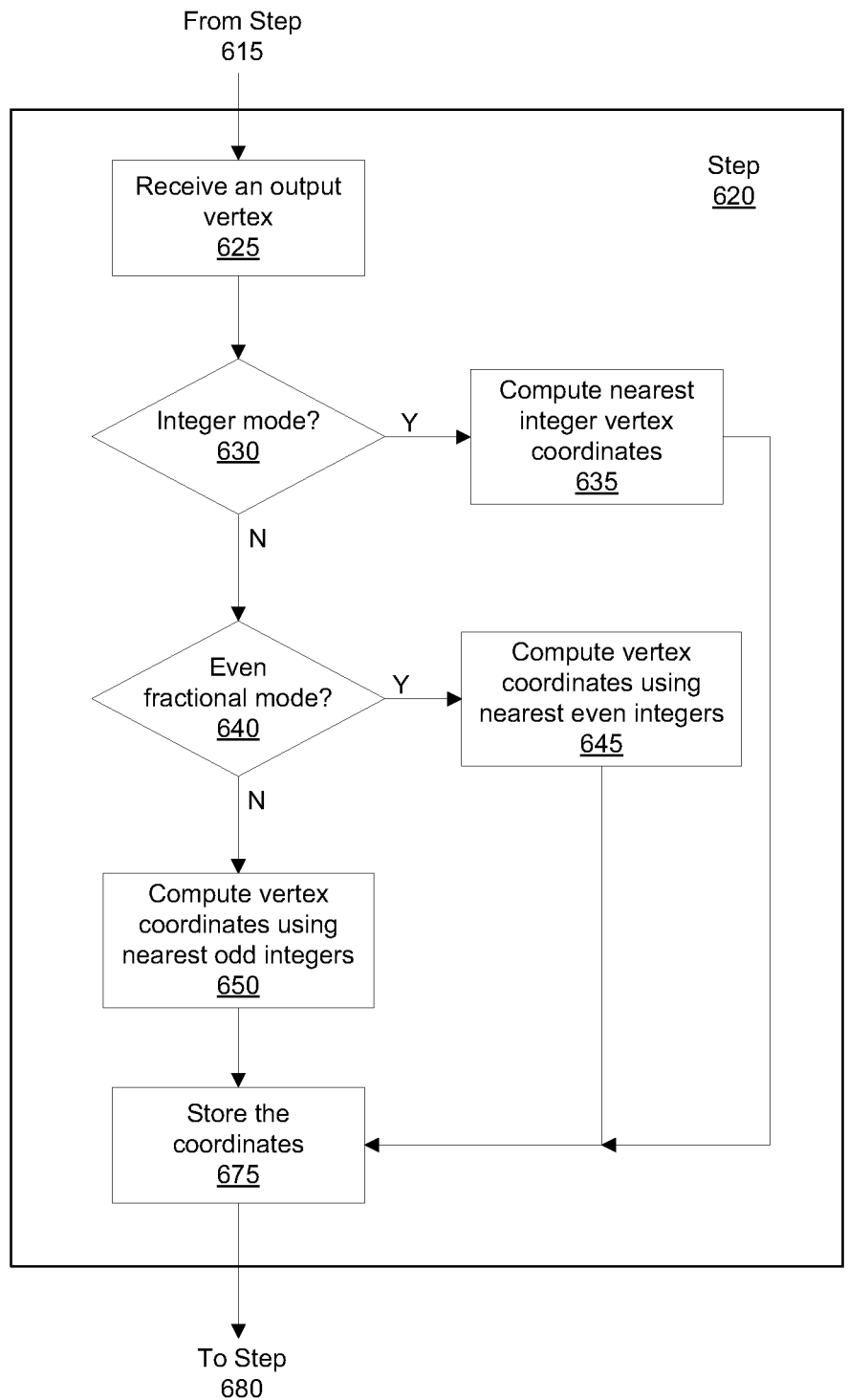
FIG. 6C is a flow diagram of a method step shown in FIG. 6B, according to one embodiment of the present invention.

In step 620 coordinate computation unit 601 processes the LOD values stored in surface data 602 to produce a (u, v)

coordinate for an output vertices and stores the coordinates in tessellation data 603, as described in detail in conjunction with FIG. 6C. In step 680 coordinate computation unit 601 determines if another output vertex should be processed, and, if so, then step 620 is repeated. When all of the output vertices for the task have been processed, coordinate computation unit 601 notifies programmable shader 600 that the output vertex coordinates are available in tessellation data 603. Note that steps 610 and 620 may be performed in parallel and, as previously explained, programmable shader 600 may start processing as soon as the (u,v) coordinates are available. Similarly, programmable shader 600 may be configured to process task t-1 while coordinate computation unit 601 and primitive index unit 604 process task t. In step 685 programmable shader 600 reads tessellation data 603 and computes attributes for the output vertices.

FIG. 6C is a flow diagram of method step 620 shown in FIG. 6B, according to one embodiment of the present invention. In step 625 coordinate computation unit 601 receives an output vertex for processing. In step 630 coordinate computation unit 601 determines if an integer spacing mode is specified for computing the (u, v) coordinates. If, the integer spacing mode is specified, then in step 635 coordinate computation unit 601 computes the nearest integer (u, v) coordinates for the vertex. The integer mode is used to simplify the coordinate computation by reducing the precision of the coordinates. The result is more abrupt transitions across LOD boundaries compared with using a fractional spacing mode to compute the (u, v) coordinates.

If, in step 630 coordinate computation unit 601 determines that the integer spacing mode is not specified for computing the (u, v) coordinates, then a fractional spacing mode is specified. Computation of the (u, v) coordinates when a fractional spacing mode is specified is more complex than producing integer (u, v) coordinates. As previously explained, providing dedicated hardware (fixed-function circuitry) to perform the computation offloads programmable shader 600 for performing other operations, and improves overall system processing performance.

Figure 7A:
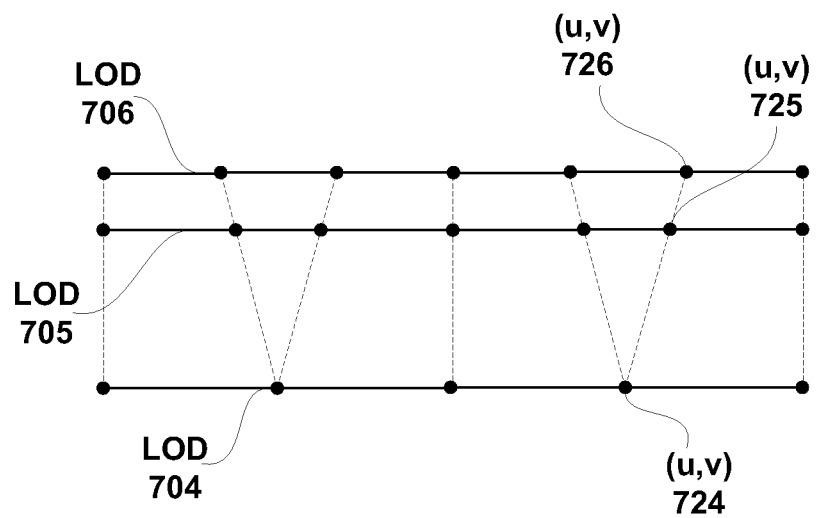
FIG. 7A is a diagram showing vertex coordinates for the even fractional mode, according to one embodiment of the present invention.

In step 640 coordinate computation unit 601 determines if the fractional spacing mode is an even fractional spacing mode, meaning that the nearest even coordinates are used to compute the (u, v) coordinates, as described in conjunction with FIG. 7A. When the even fractional spacing mode is specified, in step 645 coordinate computation unit 601 uses the nearest even integer coordinates to compute fractional (u, v) coordinates. When the odd fractional spacing mode is specified, in step 650 coordinate computation unit 601 uses the nearest odd integer coordinates to compute fractional (u, v) coordinates, as described in conjunction with FIG. 7B. In step 675 coordinate computation unit 601 stores the computed (u, v) coordinates for the output vertex in tessellation data 603.

FIG. 7A is a diagram showing vertex coordinates for the even fractional mode, according to one embodiment of the present invention. For a tessellation LOD of 5.5, shown as LOD 705 in FIG. 7A, the nearest even tessellation LOD values are 4 and 6, LOD 704 and LOD 706, respectively. Note that the tessellation LOD equals the number of segments for LOD 704 and LOD 706. As the tessellation LOD increases from 4 to 6 two new vertices and corresponding (u,v) coordinates are added. (u,v) 724 is effectively replicated to produce (u,v) 726 and another (u,v) coordinate pair. The vertices of LOD 704 that are replicated to produce higher tessellation LODs are specified by a vertex insertion pattern to produce a consistent topology across LOD boundaries. The (u,v) coordinate computation uses the same vertex insertion patterns as the topology stitching algorithm. The patterns may be fixed or programmable and preferred vertex insertion patterns insert vertices in order to produce smooth changes to the topology as the tessellation LOD varies across a surface patch.

The v coordinate is constant for all of the vertices of LOD 705. The u coordinate of (u,v) 725 is computed by linearly interpolating the corresponding u coordinate values for the nearest even tessellation LODs, e.g., (u,v) 724 and (u,v) 726. The other u coordinates for LOD 705 are computed using the corresponding (u,v) coordinates of LOD 704 and LOD 706. Importantly, the computation should produce coordinate values that are symmetric, i.e., u=1−(1−u) and v=1−(1−v). In some embodiments of the present invention, the computations are performed using 16 bit fixed point arithmetic to produce symmetric coordinate values.

Figure 7B:
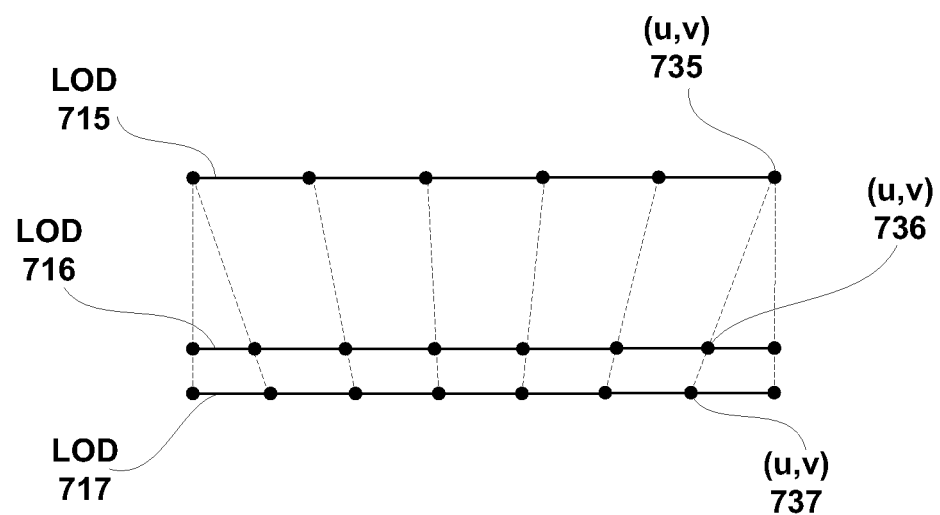
FIG. 7B is a diagram showing vertex coordinates for the odd fractional mode, according to one embodiment of the present invention.

FIG. 7B is a diagram showing vertex coordinates for the odd fractional mode, according to one embodiment of the present invention. For a tessellation LOD of 6.5, shown as LOD 716 in FIG. 7B, the nearest odd tessellation LOD values are 5 and 7, LOD 715 and LOD 717, respectively. Note that the tessellation LOD equals the number of segments for LOD 715 and LOD 717. As the tessellation LOD increases from 5 to 7 two new vertices and corresponding (u,v) coordinates are added. (u,v) 735 is effectively replicated to produce (u,v) 737 and another (u,v) coordinate pair. As previously explained, the (u,v) coordinate computation uses the same patterns as the topology stitching algorithm.

The v coordinate is constant for all of the vertices of LOD 716. The u coordinate of (u,v) 736 is computed by linearly interpolating the corresponding u coordinate values for the nearest even tessellation LODs, e.g., (u,v) 735 and (u,v) 737. The other u coordinates for LOD 716 are computed using the corresponding (u,v) coordinates of LOD 715 and LOD 717. Importantly, the computation should produce coordinate values that are symmetric, i.e., u=1−(1−u) and v=1−(1−v). In some embodiments of the present invention, the computations are performed using 16 bit fixed point arithmetic to produce symmetric coordinate values. In an embodiment of the present invention, steps 645 and 650 are performed using the code shown in TABLE 1, where lod_fp is the input LOD value and vertex_index is the index for the vertex. By way of illustration, the code is defined using C. However, any other language may be used to define the code.

TABLE 1

```
float FractionalParameterValue (float lod_fp,
                                int vertex_index,
                                int odd_even) {
    float u0, u1;
    // round lod up to nearest even or odd integer:
    ceil_lod = int (cel (lod_fp));
    if (odd_even == odd)
        ceil_lod |= 1;
    else
        if (ceil_lod & 1) ceil_lod++;
    if (ceil_lod == 2+odd){
        // special case for low LODs
        if (odd_even == odd) {
            if (vertex_index < 2) u0 = 0;
            else u0 = 1;
        }
        else {
            u0 = vertex_index / 2.0f;
        }
    }
    else {
        // find index of vertices that are merged at this level:
        // equal to: (ceil_lod-2 − odd_even) −
        // high_bit_of(ceil_lod-2 − odd_even)
```

TABLE 1-continued

```
    int merge_idx = (ceil_lod-2 – odd_even);
    int pow2 = 1;
    while (pow2 * 2 <= merge_idx)
        pow2 *= 2;
    merge)idx - = pow2;
    // compute index of vertex at previous level:
    int vertex_index_prev = vertex_index;
    if (( vertex_index – 1) > merge_idx)
        vertex_index_prev -- ;
    if (( vertex_index > (ceil_lod – merge_idx – 2))
        vertex_index_prev --;
    u0 = vertex_index_prev / float(ceil_lod – 2);
}
u1 = vertex_index / float (ceil_lod);
return (( ceil_lod – lod_fp)*u0 + (lod_fp – (ceil_lod – 2))*u1) / 2;
}
```

SPMs 310 is configured to perform some tessellation operations using programmable processing units and other tessellation operations using fixed function units with limited precision. The (u,v) parameter coordinates for each vertex are computed using fixed function units, coordinate computation units 601, to offload programmable shaders 600 and improve overall system processing performance. The (u,v) computation is a symmetric operation that is based on integer coordinates of the vertex, tessellation LOD values, and a spacing mode, e.g., integer, even fractional, or odd fractional. Offloading the limited precision (u,v) coordinate computation to dedicated circuitry allows programmable shader 600 to be used for higher precision computations that may be performed in parallel with the coordinate computation and topology stitching operations.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for performing tessellation operations using a graphics processor, the method comprising:
  receiving a set of control points defining a first three-dimensional surface patch at the graphics processor;
  receiving a fractional tessellation level of detail value for the first surface patch;
  in response to determining that an even fractional spacing mode is specified, determining a first tessellation level of detail value and a second tessellation level of detail value for performing an interpolation operation for the fractional level of detail value, wherein the first tessellation level of detail value comprises an even integer value that is less than the fractional tessellation level of detail value, and the second tessellation level of detail value comprises an even integer value that is greater than the fractional tessellation level of detail value;
  performing the interpolation operation for the fractional level of detail value, wherein the interpolation operation includes interpolating between first (u, v) coordinates associated with the first tessellation level of detail value and second (u, v) coordinates associated with the second tessellation level of detail value to compute fractional (u, v) coordinates associated with the fractional tessellation level of detail value for a vertex of the first surface patch; and
  computing vertex attributes for the vertex based on the (u, v) coordinates and the set of control points.

2. The method of claim 1, further comprising the step of determining a topology of the first three-dimensional surface patch that is defined by a stream of indices corresponding to vertices.

3. The method of claim 1, wherein computing the (u, v) coordinates for each vertex is performed with 16 bit fixed point arithmetic operations.

4. The method of claim 1, further comprising:
  in response to determining that an odd fractional spacing mode is specified, determining the first tessellation level of detail value comprising an odd integer value that is less than the fractional tessellation level of detail value and the second tessellation level of detail value comprising an odd integer value that is greater than the fractional tessellation level of detail value for performing the interpolation operation for the fractional tessellation level of detail value.

5. The method of claim 1, further comprising the step of storing the (u, v) coordinates as tessellation data.

6. The method of claim 1, further comprising the step of executing a tessellation evaluation shader in a programmable shader engine within the graphics processor to produce attributes for each vertex.

7. A graphics subsystem for performing tessellation operations, the graphics subsystem comprising:
  a graphics processor configured to:
    receive a set of control points defining a first three-dimensional surface patch at the graphics processor;
    receive a fractional tessellation level of detail value for the first surface patch;
    in response to determining that an even fractional spacing mode is specified, determine a first tessellation level of detail value and a second tessellation level of detail value for performing an interpolation operation for the fractional level of detail value, wherein the first tessellation level of detail value comprises an even integer value that is less than the fractional tessellation level of detail value, and the second tessellation level of detail value comprises an even integer value that is greater than the fractional tessellation level of detail value;
    perform the interpolation operation for the fractional level of detail value, wherein the interpolation operation includes interpolating between first (u, v) coordinates associated with the first tessellation level of detail value and second (u, v) coordinates associated with the second tessellation level of detail value to compute fractional (u, v) coordinates associated with the fractional tessellation level of detail value for a vertex of the first surface patch; and compute vertex attributes for the vertex based on the (u, v) coordinates and the set of control points.

8. The graphics subsystem of claim 7, wherein the graphics processor is further configured to determine a topology of the first three-dimensional surface patch that is defined by a stream of indices corresponding to vertices.

9. The graphics subsystem of claim 7, wherein computing the (u, v) coordinates for each vertex is performed with 16 bit fixed point arithmetic operations.

10. The graphics subsystem of claim 7, wherein the graphics processor is further configured to:
in response to determining that an odd fractional spacing mode is specified, determine the first tessellation level of detail value comprising an odd integer value that is less than the fractional tessellation level of detail value and the second tessellation level of detail value comprising an odd integer value that is greater than the fractional tessellation level of detail value for performing the interpolation operation for the fractional tessellation level of detail value.

11. The graphics subsystem of claim 7, wherein the graphics processor is further configured to store the (u, v) coordinates as tessellation data.

12. The graphics subsystem of claim 7, wherein the graphics processor is further configured to execute a tessellation evaluation shader in a programmable shader engine within the graphics processor to produce attributes for each vertex.

13. A computing device for performing tessellation operations, the computing device comprising:
a graphics processor configured to:
receive a set of control points defining a first three-dimensional surface patch at the graphics processor;
receive a fractional tessellation level of detail value for the first surface patch;
in response to determining that an even fractional spacing mode is specified, determine a first tessellation level of detail value and a second tessellation level of detail value for performing an interpolation operation for the fractional level of detail value, wherein the first tessellation level of detail value comprises an even integer value that is less than the fractional tessellation level of detail value, and the second tessellation level of detail value comprises an even integer value that is greater than the fractional tessellation level of detail value;
perform the interpolation operation for the fractional level of detail value, wherein the interpolation operation includes interpolating between first (u, v) coordinates associated with the first tessellation level of detail value and second (u, v) coordinates associated with the second tessellation level of detail value to compute fractional (u, v) coordinates associated with the fractional tessellation level of detail value for a vertex of the first surface patch; and
compute vertex attributes for the vertex based on the (u, v) coordinates and the set of control points.

14. The computing device of claim 13, wherein the graphics processor is further configured to determine a topology of the first three-dimensional surface patch that is defined by a stream of indices corresponding to vertices.

15. The computing device of claim 13, wherein computing the (u, v) coordinates for each vertex is performed with 16 bit fixed point arithmetic operations.

16. The computing device of claim 13, wherein the graphics processor is further configured to:
in response to determining that an odd fractional spacing mode is specified, determine the first tessellation level of detail value comprising an odd integer value that is less than the fractional tessellation level of detail value and the second tessellation level of detail value comprising an odd integer value that is greater than the fractional tessellation level of detail value for performing the interpolation operation for the fractional tessellation level of detail value.

17. The computing device of claim 13, wherein the graphics processor is further configured to store the (u, v) coordinates as tessellation data.

* * * * *